United States Patent
Sogawa et al.

(10) Patent No.: US 6,643,252 B2
(45) Date of Patent: Nov. 4, 2003

(54) CHUCKING APPARATUS FOR A DISK PLAYER

(75) Inventors: Teruaki Sogawa, Osaka (JP); Takayuki Murakami, Osaka (JP); Hideki Kume, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 252 days.

(21) Appl. No.: 09/934,028

(22) Filed: Aug. 21, 2001

(65) Prior Publication Data

US 2002/0024921 A1 Feb. 28, 2002

(30) Foreign Application Priority Data

Aug. 23, 2000 (JP) ........................... 2000-251752

(51) Int. Cl.[7] .............................................. G11B 23/00
(52) U.S. Cl. ........................................................ 369/270
(58) Field of Search ....................... 369/270; 360/98.08, 360/99.05, 99.12

(56) References Cited

FOREIGN PATENT DOCUMENTS

| JP | 6-215461 | 8/1994 |
|----|----------|--------|
| JP | 10-228698 | 8/1998 |
| JP | 12195215 A * | 7/2000 |

* cited by examiner

*Primary Examiner*—George J. Letscher
(74) *Attorney, Agent, or Firm*—Rosenthal & Osha L.L.P.

(57) ABSTRACT

A chucking apparatus 1 includes a chuck disk 11 and a chuck arm 17. The disk 11 is a disk lockable with a turn table 3. The arm 17 has an opening 33 through which the chuck disk 11 is insertable, and a holding part 31 where the disk 11 is rotatably arranged, plural first hooks 35 projecting inwardly radially from an edge of the opening 33, and a second hook 37 provided at the edge of the opening 33 for preventing the disk 11 in the part 31 from escaping outward. The hooks 35 allow insertion of the disk 11 in the part 31 and support the disk 11 in the part 31. The second hook 37 is shaped to have rigidity against a force received when the disk 11 tends to escape from the holding part than that against a force received when the disk 11 is mounted.

4 Claims, 2 Drawing Sheets

CHUCKING APPARATUS FOR A DISK PLAYER

BACKGROUND OF THE INVENTION

1. Field of the Invention

The present invention relates to a chucking apparatus for a disk player, and more particularly to the chucking apparatus for holding a disk placed on a turn table of the disk player.

2. Description of the Related Art

There have been already proposed chucking apparatuses for holding a disk placed on a turn table of a disk player which are disclosed in Japanese Publications Nos. JP-A-10-228698 and JP-A-6-215461 of unexamined patent applications. In these chucking apparatuses, there are provided a chuck disk and a chuck arm. The chuck disk is a disc-like member which has a locking portion to be locked with the turn table, on its one face. The chuck arm is provided with an opening, and the chuck disk is rotatably disposed inside an inner periphery of this opening.

In these apparatuses, the disk can be held by placing the disk on the turn table and locking the locking portion of the chuck disk with the turn table. The chuck disk rotates integrally with the turn table in a state where the disk is held between the turn table and the chuck disk.

Generally, in case of assembling the chucking apparatus of this type, firstly, the locking portion of the chuck disk is passed along the inner periphery of the opening and positioned at the turn table side. On this occasion, the chuck disk is abutted against an edge of the opening at an outer circumference of its disc-like part, thus preventing an escape of the chuck disk from the chuck arm toward the turn table. Then, a separate member is attached to the chuck arm so as to cover the outer circumference of the chuck disk. This will also restrain an escape of the chuck disk from the chuck arm toward an opposite side of the turn table.

In the conventional chucking apparatuses, it has been necessary to conduct a work for attaching the separate member to the chuck arm, after the chuck disk has been inserted into the chuck arm.

In order to assemble the apparatus in a more simple manner, it has been considered that the chuck arm and the separate member are integrally formed to provide a holding part for holding the chuck disk, and an insertion opening for inserting the chuck disk is formed in the holding part.

When assembling such an apparatus, the chuck disk is inserted from the turn table side contrarily to the conventional assembling manner. In case where such a structure has been employed, it has been necessary to provide, at a plurality of positions on the edge of the opening, retaining projections whose distal ends extend up to slightly inner positions in a radial direction than the outer diameter of the chuck disk in order to prevent the escape of the chuck disk from the insertion opening and, at the same time, to allow the chuck disk to easily pass through the insertion opening.

However, in such a structure, in order to facilitate the work for installing the chuck disk in the holding part, an inwardly projected amount of the retaining projections is limited. In other words, sufficient length of the projections to catch the chuck disk cannot be ensured. Therefore, in some cases, the chuck disk may fall from the holding part, because the chuck disk may push the projections due to vibrations or so during transportation, and the projections may be deformed.

SUMMARY OF THE INVENTION

An object of the invention is to provide a chucking apparatus which can be easily assembled, and in which an escape of a chuck disk from a chuck arm can be prevented.

According to a first aspect of the invention, there is provided a chucking apparatus for holding a disk placed on a turn table of a disk player, including a chuck disk and a chuck arm. The chuck disk is a disk having a disc-like shape which can be locked with a turn table. The chuck arm has an opening through which the chuck disk can be inserted, and includes a holding part in which the chuck disk is rotatably arranged, a plurality of first hooks projecting inwardly in a radial direction from an edge of the opening, and at least one second hook provided at the edge of the opening for preventing the chuck disk in the holding part from escaping outward.

The plurality of the first hooks allow the chuck disk to be inserted into the holding part and support the chuck disk in the holding part. The second hook has such a shape that it has higher rigidity with respect to a force received when the chuck disk tends to escape from the holding part as compared with rigidity with respect to a force received when the chuck disk is installed.

When assembling this apparatus, the chuck disk is installed in the holding part through the opening. On this occasion, the plurality of the first hooks are in such an arrangement and a shape that the chuck disk can be passed through the opening. On the other hand, the second hook is pushed by the chuck disk and elastically deformed. However, because the second hook has relatively low rigidity with respect to a force received at this installation, it can be easily deformed elastically. Therefore, the chuck disk can be easily installed in the holding part.

In the chucking apparatus which has been thus assembled, after the disk is placed on the turn table, the chuck disk is locked with the turn table to hold the disk. The chuck disk rotates integrally with the turn table in a state where the disk is held between the chuck disk and the turn table.

In some cases, the chuck arm may be subjected to a force in an axial direction due to vibrations or a shock during transportation or so. In such cases, when the chuck disk tends to escape from the holding part, the outer circumference of the chuck disk interferes with the second hook. However, the second hook has relatively high rigidity with respect to a force received when the chuck disk tends to escape from the holding part, and accordingly, is hard to be elastically deformed. Therefore, the escape of the chuck disk from the holding part can be restrained.

In the chucking apparatus according to a second aspect of the invention, the second hook has higher rigidity in an axial direction of the chuck disk as compared with rigidity in a radial direction of the chuck disk.

In this apparatus, in case of installing the chuck disk in the chuck arm, the chuck disk passes through the opening of the holding part while the second hook is elastically deformed in a radial direction. On this occasion, because the second hook has relatively low rigidity in a radial direction, the second hook is easily deformed elastically when it has received a force in a radial direction when the chuck disk is installed. This facilitates installation of the chuck disk. On the other hand, the second hook has relatively high rigidity in an axial direction, and is hard to be deformed elastically in this direction. Accordingly, when the chuck disk tends to escape from the holding part exerting a force in the axial direction on the second hook, the second hook will not be easily deformed elastically, and thus, prevents the chuck disk from escaping from the holding part.

In the chucking apparatus according to a third aspect of the invention, the second hook is formed in a U-shape extending from the edge of the opening in the chuck arm toward an opposite side to the holding part, folded back toward an inner periphery of the opening, and extending toward the holding part.

In this apparatus, in case of installing the chuck disk in the chuck arm, since the second hook is formed in a U-shape, a distal end of the second hook is easily deformed elastically in a radial direction when the chuck disk passes through the insertion opening, and hard to be elastically deformed in an axial direction. Therefore, the work for installing the chuck disk in the holding part will be easily conducted, and the escape of the chuck disk from the holding part can be restrained.

In the chucking apparatus according to a fourth aspect of the invention, the distal end of the second hook is positioned more inwardly in a radial direction than distal ends of the first hooks.

In this apparatus, because the distal end of the second hook is positioned more inwardly in a radial direction than the distal ends of the first hooks, the escape of the chuck disk from the holding part can be more reliably restrained.

DETAILED DESCRIPTION OF THE PREFERRED EMBODIMENTS

Now, a description will be given in more detail of preferred embodiments of the invention with reference to the accompanying drawings.

Figure 1:
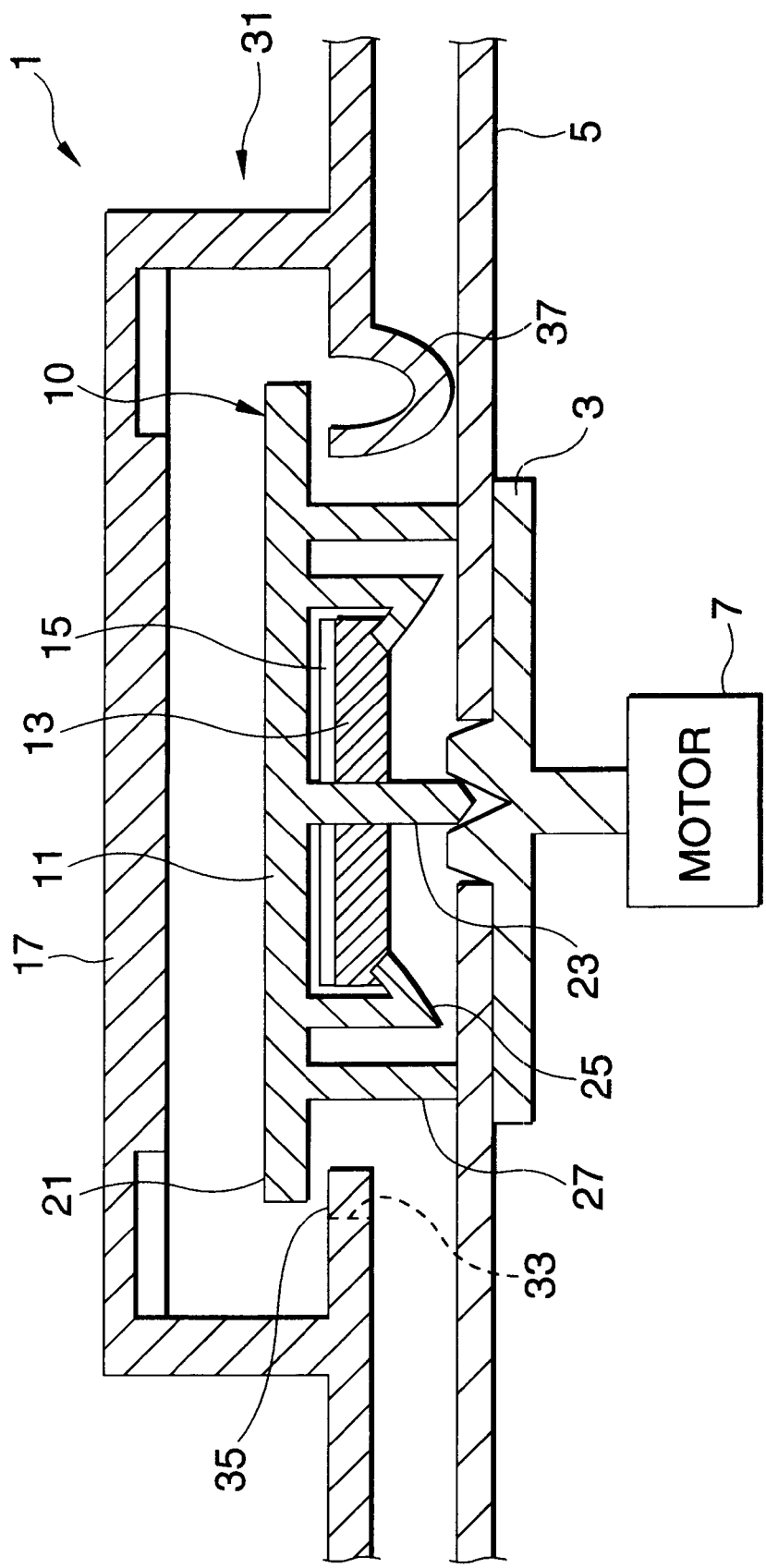
FIG. 1 is a longitudinally sectional view showing a chucking apparatus according to an embodiment of the invention.

FIG. 1 shows a chucking apparatus 1 in which an embodiment according to the invention has been employed.

The chucking apparatus 1 is an apparatus for holding a disk 5 placed on a turn table 3, and the chucking apparatus 1 is located inside a disk player (not shown). The turn table 3 is connected to a motor 7 so as to rotate integrally with the motor. The chucking apparatus 1 includes a chuck disk 10 and a chuck arm 17.

The chuck disk 10 has a disk body 11, and a magnet 13 and a yoke plate 15 which are provided inside the disk body 11.

The disk body 11 consists of a disk part 21, a locking portion 23 formed on one face of the disk part 21, a plurality of holding portions 25, and a pressing portion 27. The locking portion 23 is provided so as to lock the chuck disk 10 with the turn table 3 and vertically projects from a center of the disk part 21. The plurality of the holding portions 25 are provided at a determined interval in a circumferential direction so as to hold the magnet 13 and the yoke plate 15 in an inner peripheral part of the chuck disk 10. The pressing portion 27 is a member formed in an annular shape surrounding the plurality of the holding portions 25 so as to press a surface of the disk 5 and clamp the disk 5 between the turn table 3 and the pressing portion 27.

The magnet 13 is an annular magnet, and opposed to the turn table 3 so that the chuck disk 10 can be attracted toward the turn table 3.

The yoke plate 15 is a disc-like member for assisting magnetic force of the magnet 13, and arranged between the magnet 13 and the chuck disk 10 in an axial direction.

Figure 2:
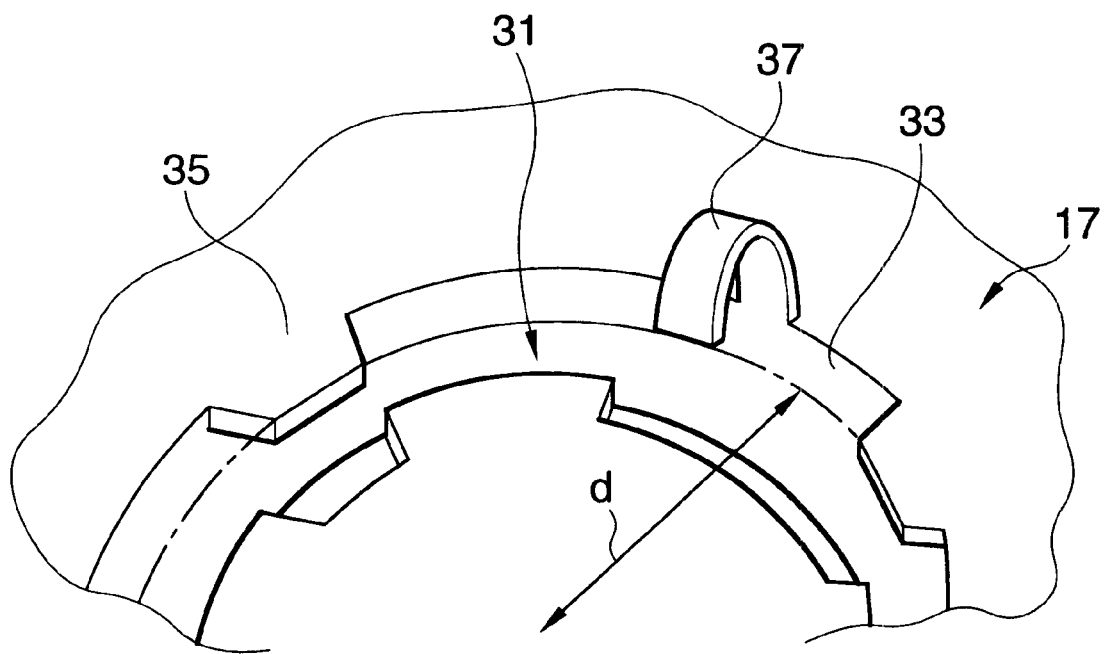
FIG. 2 is a perspective view of an outer appearance of a part of a chuck arm provided in the above apparatus.

The chuck arm 17 is a member made of synthetic resin, and provided with a holding part 31 in which the chuck disk 10 can be rotatably disposed. As shown in FIGS. 1 and 2, the holding part 31 is a circular recess which is dented in a direction away from the turn table 3, and has a space of a determined size in which the chuck disk 10 can move in an axial direction. FIG. 2 is a perspective view of an outer appearance of the holding part 31 as seen from the turn table 3. There is formed an opening 33 through which the chuck disk 10 can be inserted at a side of the holding part 31 adjacent to the turn table 3.

The chuck arm 17 is provided with first hooks 35 in a shape of a plate extending inwardly in a radial direction at a plurality of positions (three in this embodiment) on an edge of the opening 33. A diameter d of a circle connecting distal ends (inner ends) of the first hooks 35 (See FIG. 2) is smaller than the outer diameter of the chuck disk 10. Accordingly, the chuck disk 10 positioned inside the holding part 31 can be held by these first hooks 35.

There is formed at the edge of the opening 33, a second hook 37 for preventing an escape of the chuck disk 10 which has been once inserted into the holding part 31. The second hook 37 is formed in a U-shape extending from the edge of the opening 33 toward the turn table 3, folded back inwardly of the opening 33, and extending toward the holding part 31. A distal end of this second hook 37 in the U-shape is located within the aforesaid diameter d of the circle connecting the distal ends of the first hooks 35. Such second hook 37 in the U-shape has relatively low rigidity with respect to a force in a radial direction, and has higher rigidity with respect to a force in an axial direction as compared with that in the radial direction. Therefore, elastic deformation of the second hook 37 in the radial direction is easily performed, but elastic deformation of the same in the axial direction is difficult.

When assembling the chucking apparatus 1, the chuck disk 10 is inserted into the holding part 31 through the opening 33. On this occasion, the radially inwardly projected amount of the first hooks 35 is such that the chuck disk 10 can be inserted into the holding part 31 while the chuck disk 10 is moved offset in a radial direction to avoid interference with the first hooks 35. On installing the chuck disk 10 into the holding part 31, the outer circumference of the chuck disk 10 interferes with the distal end of the second hook 37. In short, the second hook 37 is pushed outwardly in a radial direction by the chuck disk 10. However, because the second hook 37 has low rigidity with respect to a force in the radial direction, it is easily deformed elastically. Therefore, the chuck disk 10 can be easily installed into the holding part 31 while elastically deforming the second hook 37.

Once the chuck disk 10 has been inserted into the holding part 31 in this manner, it is possible to hold the chuck disk 10 by means of the three first hooks 35 by locating the chuck disk 10 at a center of the holding part 31.

In the chucking apparatus 1 which has been thus assembled, after the disk 5 is placed on the turn table 3, the chuck disk 10 is locked with the turn table 3 to hold the disk 5. When the motor 7 is actuated to rotate the turn table 3, the chuck disk 10 rotates integrally with the turn table 3.

The chuck arm 17 is subjected to a force in an axial direction due to vibrations or so during transportation. When subjected to such a force, the chuck disk 10 pushes the distal end of the second hook 37 and tends to escape from the holding part 31. However, because the second hook 37 has high rigidity with respect to a force in the axial direction, and is hard to be elastically deformed, the escape from the holding part 31 can be effectively prevented. Since the distal end of the second hook 37 is positioned more inwardly than the first hooks 35, the escape of the chuck disk 10 from the holding part 31 can be more reliably prevented.

[Other Embodiments]

(a) A shape of the second hook 37 is not limited to the U-shape, but any other shape can be employed, provided that the rigidity is low with respect to the force received when the chuck disk is mounted, while the rigidity is high with respect to the force received when the chuck disk 10 tends to escape.

(b) A plurality of the second hooks 37 may be provided on the edge of the opening 33.

According to the present invention, the second hook is formed in such a shape that it is easily deformed elastically when the chuck disk is installed, and is hard to be elastically deformed when the chuck disk 10 tends to escape. Accordingly, the chucking apparatus can be easily assembled, and the escape of the chuck disk from the chuck arm can be prevented.

What is claimed is:

1. A chucking apparatus for a disk player for holding a disk placed on a turntable of said disk player, said apparatus comprising a chuck disk having a disc-like shape which can be locked with said turn table; and a chuck arm having an opening through which said chuck disk can be inserted, and including a holding part in which said chuck disk is rotatably arranged, a plurality of first hooks projecting from an edge of said opening inwardly in a radial direction, and at least one second hook provided at the edge of said opening for preventing the chuck disk in said holding part from escaping outward;

wherein said plurality of the first hooks allow insertion of said chuck disk into said holding part and support said chuck disk in said holding part; and wherein said second hook has such a shape that it has higher rigidity with respect to a force received when said chuck disk tends to escape from said holding part as compared with rigidity with respect to a force received when said chuck disk is installed.

2. A chucking apparatus for a disk player as claimed in claim 1, wherein said second hook has higher rigidity in an axial direction of said chuck disk as compared with rigidity in a radial direction of said chuck disk.

3. A chucking apparatus for a disk player as claimed in claim 1, wherein said second hook is formed in a U-shape extending from the edge of said opening in said chuck arm toward an opposite side to said holding part, folded back toward an inner periphery of said opening, and extending toward said holding part.

4. A chucking apparatus for a disk player as claimed in claim 1, wherein a distal end of said second hook is positioned more inwardly in a radial direction than distal ends of said first hooks.

* * * * *